(12) United States Patent
Millar

(10) Patent No.: US 11,089,742 B2
(45) Date of Patent: Aug. 17, 2021

(54) PERISTALTIC PUMPS IN AN ASSEMBLY LINE GROW POD AND METHODS OF PROVIDING FLUIDS VIA PERISTALTIC PUMPS

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 357 days.

(21) Appl. No.: 15/991,510

(22) Filed: May 29, 2018

(65) Prior Publication Data

US 2018/0359954 A1 Dec. 20, 2018

Related U.S. Application Data

(60) Provisional application No. 62/519,438, filed on Jun. 14, 2017, provisional application No. 62/519,428, filed on Jun. 14, 2017.

(51) Int. Cl.
*A01G 9/24* (2006.01)
*A01G 31/04* (2006.01)
*A01G 9/08* (2006.01)

(52) U.S. Cl.
CPC ........... *A01G 9/247* (2013.01); *A01G 31/042* (2013.01); *A01G 9/088* (2013.01)

(58) Field of Classification Search
CPC .... A01G 31/042; A01G 31/045; A01G 31/02; A01G 27/003; A01G 9/247
See application file for complete search history.

(56) References Cited

U.S. PATENT DOCUMENTS 3,327,425 A * 6/1967 Dosedla ............... A01G 31/042
47/60
3,771,258 A * 11/1973 Charney ............... A01G 9/143
47/65

(Continued)

FOREIGN PATENT DOCUMENTS

CN 105104158 12/2015
GB 2121263 A 12/1983

(Continued)

OTHER PUBLICATIONS instructables.com; Grow box—automated, stackable; retrieved from http://www.instructables.com/id/Stacking-Automated-Grow-Box/ on Dec. 1, 2014.

(Continued)

*Primary Examiner* — Peter M Poon
*Assistant Examiner* — Morgan T Barlow
(74) *Attorney, Agent, or Firm* — Dinsmore & Shohl LLP

(57) ABSTRACT

Devices, systems, and methods for providing a predetermined amount of fluid in an assembly line grow pod are provided. Some embodiments include an assembly line grow pod including a tray held by a cart supported on a track, the tray including at least one section. The assembly line grow pod further includes a fluid source and a watering station. The watering station includes a robot device having a movable arm and at least one peristaltic pump coupled to the arm, the peristaltic pump having an inlet and an outlet, the inlet fluidly coupled to the fluid source. A predetermined amount of fluid from the fluid source is delivered to the at least one section of the tray via movement of the movable arm of the robot device to align the outlet of the peristaltic pump with the at least one section and via ejection of the fluid from the outlet.

20 Claims, 11 Drawing Sheets

(56) References Cited

U.S. PATENT DOCUMENTS

| | | | |
|---|---|---|---|
| 3,817,454 A * | 6/1974 | Pira | A01G 27/003 239/76 |
| 3,824,736 A * | 7/1974 | Davis | A01G 7/045 47/17 |
| 3,945,148 A * | 3/1976 | Oyama | A01G 31/02 47/14 |
| 4,723,714 A | 2/1988 | Lucas | |
| 5,135,174 A * | 8/1992 | Chaplinsky | A01C 23/042 239/310 |
| 5,452,747 A * | 9/1995 | De Man | A01G 25/16 137/885 |
| 6,055,771 A * | 5/2000 | Warnacut | A01C 1/02 47/58.1 R |
| 6,279,263 B1 * | 8/2001 | Lai | A01G 31/02 47/65 |
| 6,360,482 B1 | 3/2002 | Boyes | |
| 6,402,846 B1 * | 6/2002 | Johnson | B05C 5/0208 118/256 |
| 6,471,774 B1 * | 10/2002 | Krueger | B05C 1/06 118/264 |
| 6,636,010 B1 * | 10/2003 | Malmstrom | A61M 5/142 318/11 |
| 6,786,425 B2 * | 9/2004 | Rawlings | B05B 1/3013 239/550 |
| 7,063,276 B2 * | 6/2006 | Newton | A01C 23/04 239/146 |
| 8,627,598 B1 * | 1/2014 | Souder | A01G 31/042 47/65 |
| 8,986,417 B1 * | 3/2015 | Miller | C05G 5/20 71/28 |
| 9,795,097 B2 * | 10/2017 | Williams | A01G 31/06 |
| 10,136,587 B1 * | 11/2018 | Johnson | A01G 7/02 |
| 10,264,737 B2 * | 4/2019 | Johansson | A01G 7/045 |
| 2005/0206340 A1 * | 9/2005 | Brundle | A61M 5/142 318/685 |
| 2009/0104004 A1 * | 4/2009 | Guglielmelli | A47G 21/08 414/9 |
| 2011/0219685 A1 * | 9/2011 | Goldman | A01G 27/006 47/58.1 R |
| 2011/0243793 A1 * | 10/2011 | Kalin | H02P 8/14 422/67 |
| 2011/0258926 A1 * | 10/2011 | Bijl | A01G 9/027 47/66.6 |
| 2012/0137578 A1 | 6/2012 | Bradford et al. | |
| 2012/0209243 A1 * | 8/2012 | Yan | B05B 1/202 604/500 |
| 2012/0324788 A1 | 12/2012 | Sakura et al. | |
| 2015/0173309 A1 * | 6/2015 | Golgotiu | A01G 27/003 47/1.7 |
| 2015/0216116 A1 * | 8/2015 | Hirai | A01C 11/00 47/1.01 P |
| 2016/0192594 A1 * | 7/2016 | Mawendra | A01G 31/042 47/62 R |
| 2017/0035002 A1 * | 2/2017 | Ellins | A01G 31/02 |
| 2017/0265408 A1 | 9/2017 | McGowan et al. | |
| 2017/0347538 A1 * | 12/2017 | Nakajima | A01G 27/00 |
| 2018/0007845 A1 | 1/2018 | Martin | |
| 2018/0014475 A1 * | 1/2018 | Gomi | A01G 9/18 |
| 2018/0042186 A1 | 2/2018 | Kop | |
| 2018/0132436 A1 * | 5/2018 | Everett | A01C 23/042 |
| 2018/0343812 A1 * | 12/2018 | Leo | F02C 3/04 |
| 2019/0029200 A1 * | 1/2019 | Mawendra | A01G 20/30 |
| 2019/0120234 A1 * | 4/2019 | Correia | F04B 23/021 |
| 2020/0037524 A1 * | 2/2020 | Friedman | A01G 9/0295 |

FOREIGN PATENT DOCUMENTS

| | | | |
|---|---|---|---|
| KR | 20140046250 A | 4/2014 | |
| WO | WO-0052994 A2 * | 9/2000 | A01C 23/007 |
| WO | WO-2011007928 A1 * | 1/2011 | A01G 31/02 |

OTHER PUBLICATIONS growershouse.com; Bluelab PeriPod L3; retrieved from https://growershouse.com/bluelab-peripod-l3 on Apr. 9, 2018.

International Search Report and Written Opinion pertaining to International Application No. PCT/US2018/035050 dated Aug. 20, 2018.

* cited by examiner

PERISTALTIC PUMPS IN AN ASSEMBLY LINE GROW POD AND METHODS OF PROVIDING FLUIDS VIA PERISTALTIC PUMPS

CROSS REFERENCE TO RELATED APPLICATION

This application claims the benefit of U.S. Provisional Application Ser. No. 62/519,438, filed on Jun. 14, 2017 and U.S. Provisional Application Ser. No. 62/519,428, filed on Jun. 14, 2017, each of which are incorporated by reference in their respective entireties.

TECHNICAL FIELD

Embodiments described herein generally relate to systems and methods for providing fluids in an assembly line grow pod and, more specifically, to use of one or more peristaltic pumps in an assembly line grow pod to provide a measured amount of fluid to plant material.

BACKGROUND

Industrial grow pods that are used to continuously grow crops may utilize an assembly line of carts that continuously traverse a track as plant seeds are planted, grown, and harvested, and then continue to traverse the track as the carts (and/or trays thereon) are cleaned and washed to repeat the process. To ensure smooth operation of the industrial grow pod, it may be necessary to ensure that precise amounts of fluids are supplied to plant material (including plants, shoots, and seeds) within the grow pod (such as water, nutrients, ambient air conditions, and the like) at a particular time to ensure optimum growth, to avoid excess fluid (e.g., runoff), and/or the like. Current solutions may provide watering and nutrient distribution, but often fail to provide specific and customized water and distribution to plant material in a manner that allows specific plant material in specific trays (or portions thereof) to receive a measured amount of fluid.

SUMMARY

Devices, systems, and methods for providing a predetermined amount of fluid in an assembly line grow pod are disclosed. One embodiment includes an assembly line grow pod including a tray held by a cart supported on a track, the tray having at least one section. The assembly line grow pod further includes a fluid source and a watering station. The watering station includes a robot device having a movable arm and at least one peristaltic pump coupled to the movable arm of the robot device. The at least one peristaltic pump includes an inlet and an outlet, the inlet fluidly coupled to the fluid source. A predetermined amount of fluid from the fluid source is delivered to the at least one section of the tray via movement of the movable arm of the robot device to align the outlet of the at least one peristaltic pump with the at least one section and via ejection of the fluid from the outlet.

In another embodiment, a watering station adjacent to a track carrying a cart supporting a tray in an assembly line grow pod includes a robot device having a movable base and a movable arm and a plurality of peristaltic pumps supported on the movable arm of the robot device. Each peristaltic pump of the plurality of peristaltic pumps includes an outlet. The watering station further includes a sensor positioned to sense a location of one or more sections of the tray. The robot device moves, via the movable base and the movable arm, to align at least one of the plurality of peristaltic pumps with the one or more sections of the tray such that a predetermined amount of fluid is distributed by the at least one of the plurality of peristaltic pumps into the one or more sections of the tray.

In yet another embodiment, a method of providing a predetermined amount of fluid in an assembly line grow pod includes moving a cart supporting a tray having a plurality of sections containing plant material therein along a track adjacent to a watering station comprising a movable robot device supporting a plurality of peristaltic pumps, determining an amount of fluid to be delivered to each section of the plurality of sections, determining one or more movements of the movable robot device to align the plurality of peristaltic pumps with the plurality of sections, directing the movable robot device to move according to the one or more movements, and directing the plurality of peristaltic pumps to eject the determined amount of fluid into the plurality of sections.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include devices, systems, and methods for distributing a precise amount of fluid to each section of a plurality of sections of a tray on a cart supported on a track in an assembly line grow pod. The assembly line grow pod may include a plurality of carts that follow the track. The devices, systems, and methods may be embodied as one or more peristaltic pumps coupled to a robot arm, which, in addition to one or more other components in the assembly line grow pod, directs a specific amount of water and/or nutrients are supplied to ensure optimum growth of the seeds, shoots, and/or plants as the trays traverse the track. The one or more peristaltic pumps may be controlled by a master controller of the assembly line grow pod, such as a master controller.

As used herein, the term "plant material" may encompass any type of plant and/or seed material at any stage of growth, for example and without limitation, seeds, germinating seeds, vegetative plants, and plants at a reproductive stage.

Figure 1A:
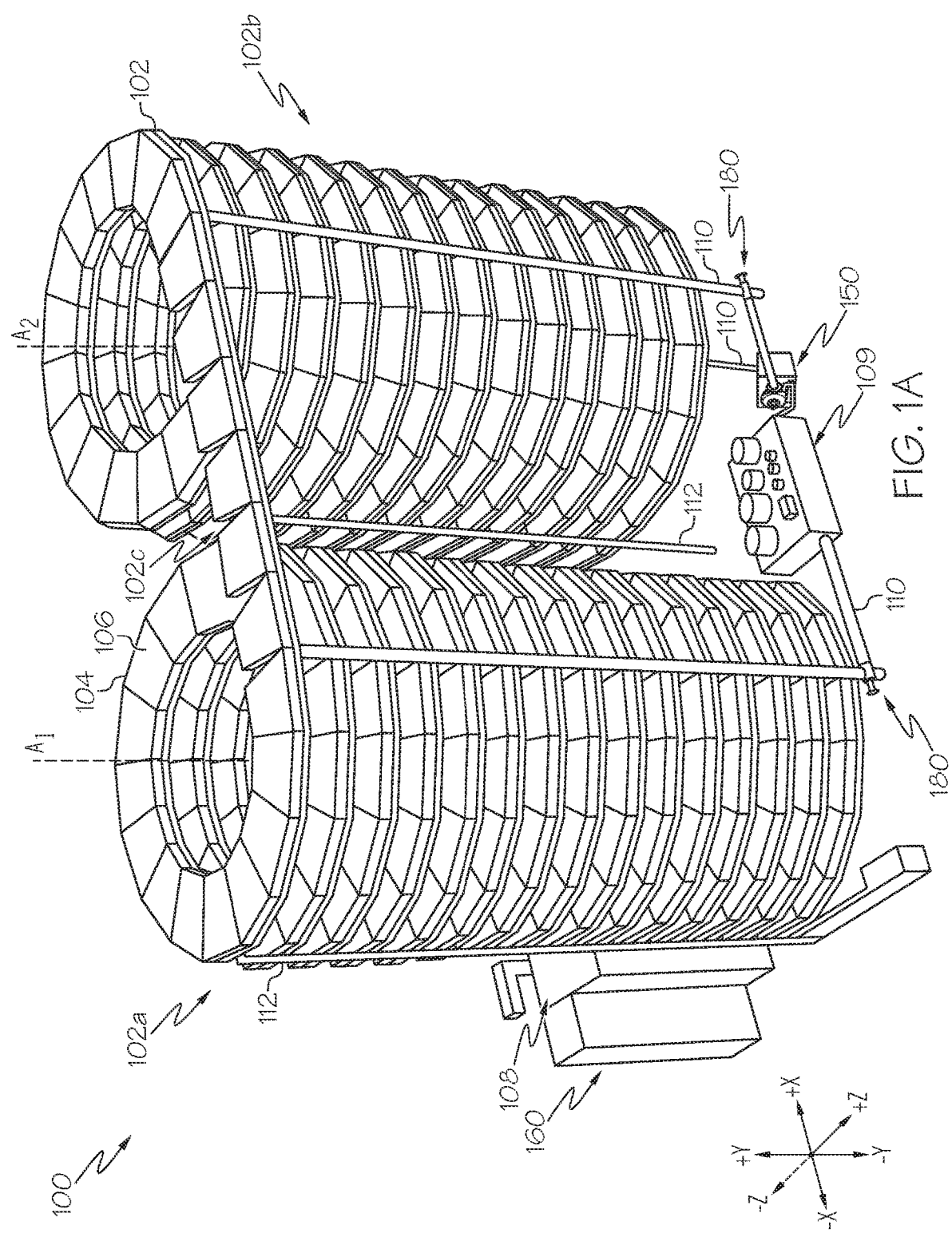
FIG. 1A schematically depicts a front perspective view of an illustrative assembly line grow pod having one or more peristaltic pumps according to one or more embodiments shown and described herein.
Figure 1B:
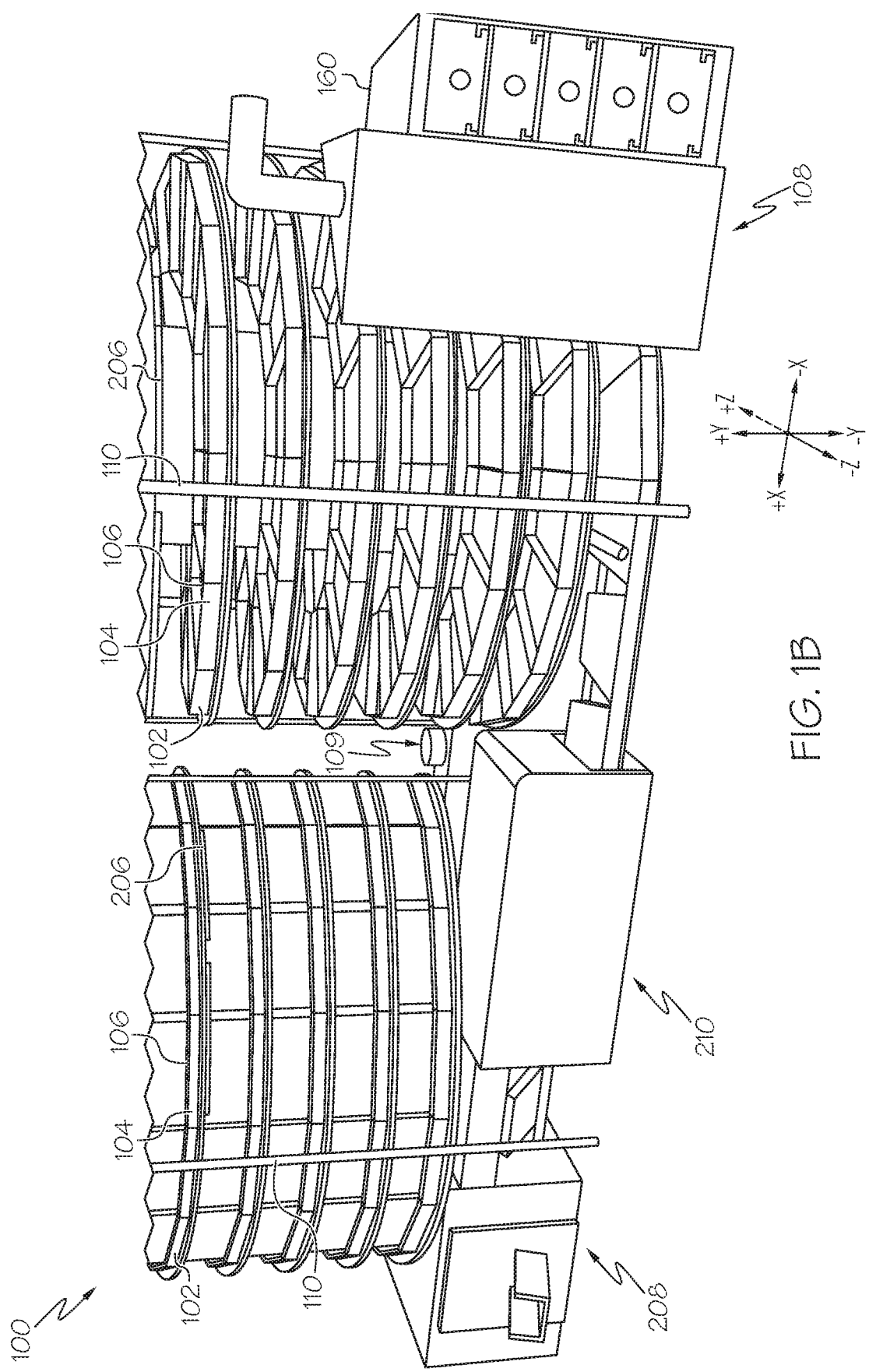
FIG. 1B schematically depicts a rear perspective view of a portion of an illustrative assembly line grow pod having one or more peristaltic pumps according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 having a fluid distribution manifold according to one or more embodiments shown and described herein. In addition, FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counter-clockwise direction, as shown in FIG. 1A) a first axis $A_1$, such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

The ascending portion 102a and the descending portion 102b may allow the track 102 to extend a relatively long distance while occupying a comparatively small footprint evaluated in the x-direction and the z-direction as depicted in the coordinate axes of FIG. 1A, as compared to assembly line grow pods that do not include an ascending portion 102a and a descending portion 102b. Minimizing the footprint of the assembly line grow pod 100 may be advantageous in certain applications, such as when the assembly line grow pod 100 is positioned in a crowded urban center or in other locations in which space may be limited.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding seeds as the seeds germinate and grow into plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In addition, the seeds (and thereafter the shoots and plants) within the trays 106 may be monitored, provided with water, nutrients, environmental conditions, light, and/or the like to facilitate growing.

Also depicted in FIGS. 1A and 1B is a master controller 160. The master controller 160 may include, among other things, control hardware for controlling various components of the assembly line grow pod 100, as described in greater detail herein. In some embodiments, the master controller 160 may be arranged as a modular control interface that receives a plurality of hot-swappable control modules, as described in greater detail herein. In some embodiments, the master controller 160 may be particularly configured to control operation of a plurality of peristaltic pumps, as described in greater detail herein.

Coupled to the master controller 160 is a seeder component 108. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect the presence of the respective cart 104 and may begin laying seed across an area of the single section tray 106. The seed may be laid out according to a desired depth of seed, a desired number of seeds, a desired surface area of seeds, a size of a section of the tray 106, and/or according to other criteria. In some embodiments, the seeds may be pre-treated with nutrients and/or anti-buoyancy agents (such as water) as these embodiments may not utilize soil to grow the seeds and thus might need to be submerged. Such a pre-treatment of seeds may be completed by one or more peristaltic pumps, as described in greater detail herein.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual sections/cells) according to a desired number of seeds, a desired area the seeds should cover, a desired depth of seeds, etc.

Referring to FIG. 1A, the assembly line grow pod 100 may also include a watering component 109 coupled to one or more water lines 110 (e.g., fluid lines) via one or more fluid pumps 150 and/or one or more flow control valves 180 in some embodiments. While only a single fluid pump 150 is depicted in FIG. 1A, it should be understood that the assembly line grow pod 100 may incorporate a plurality of fluid pumps 150 in some embodiments. Likewise, while a plurality of flow control valves 180 are depicted in FIG. 1A, it should be understood that the assembly line grow pod 100 may incorporate a single flow control valve 180 in some embodiments. The watering component 109, the one or more fluid pumps 150, the one or more flow control valves 180, and the one or more water lines 110 may distribute water and/or nutrients to one or more peristaltic pumps (not shown) located at various locations within the assembly line grow pod 100, which then distribute a precise amount of water and/or nutrients to trays 106 as described in greater detail herein. In some embodiments, the master controller 160 may be communicatively coupled to the watering component 109, the one or more fluid pumps 150, and the one or more flow control valves 180 such that the master controller 160 transmits signals for the operation of the watering component 109, the one or more fluid pumps 150, and the one or more flow control valves 180 to selectively control flow and/or pressure of fluid accordingly, as described herein.

For example, the one or more water lines 110 may extend between the watering component 109 and one or more watering stations having one or more peristaltic pumps and arranged at particular locations within the assembly line grow pod 100 such that the fluid pumps 150 connected in line with the water lines 110 pump water and/or nutrients to the one or more watering stations and into the one or more peristaltic pumps and the one or more flow control valves 180 direct flow of the water and/or nutrients to the one or more peristaltic pumps within each of the one or more watering stations. As a cart 104 passes a watering station, a particular amount of water may be provided to the tray 106 (or a portion thereof) supported by the cart 104 and/or individual sections within the tray 106 by the one or more peristaltic pumps, as described in greater detail herein. For example, seeds may be watered by the one or more peristaltic pumps to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water to be supplied to the tray 106 via the one or more peristaltic pumps at that time.

In addition, the watering component 109 is communicatively coupled to the master controller 160 such that the master controller 160 provides control signals to the watering component 109 and/or receives status signals from the watering component 109. As a result of this providing and receiving of signals, the master controller 160 can effectively direct the watering component 109 to provide fluid to the one or more peristaltic pumps via one or more water lines 110 fluidly coupled to the watering component 109.

Also depicted in FIG. 1A are airflow lines 112, which may also be fluidly connected to one or more air pumps and/or one or more air valves (not shown in FIG. 1A). Specifically, the one or more air pumps may be pumps that are similar to fluid pumps 150, but are coupled to the airflow lines 112 to deliver air to one or more portions of the assembly line grow pod 100. In addition, the one or more air valves may be valves that are similar to the flow control valves 180, but are coupled to the airflow lines 112 to direct airflow to one or more portions of the assembly line grow pod 100. The air may be delivered, for example, to control a temperature of the assembly line grow pod 100 or an area thereof, a pressure of the air in the assembly line grow pod 100 or an area thereof, control a concentration of carbon dioxide ($CO_2$) in the air of the assembly line grow pod 100 or an area thereof, control a concentration of oxygen in the air of the assembly line grow pod 100 or an area thereof, control a concentration of nitrogen in the air of the assembly line grow pod 100 or an area thereof, and/or the like.

Accordingly, the airflow lines 112 may distribute the airflow at particular areas in the assembly line grow pod 100 to facilitate control. As such, the airflow lines 112 may be fluidly coupled to a pump and/or a valve and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. While also referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are provided with light, provided with water, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in the cart 104 are not ready for harvesting, the assembly line grow pod 100 may commission the cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more fluid pumps 150 and directed via the one or more flow control valves 180 (FIG. 1A) through the water lines 110.

Still referring to FIG. 1B, the tray 106 may be overturned to output the plant for processing and the tray 106 may remain in this position in some embodiments. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

Figure 2:
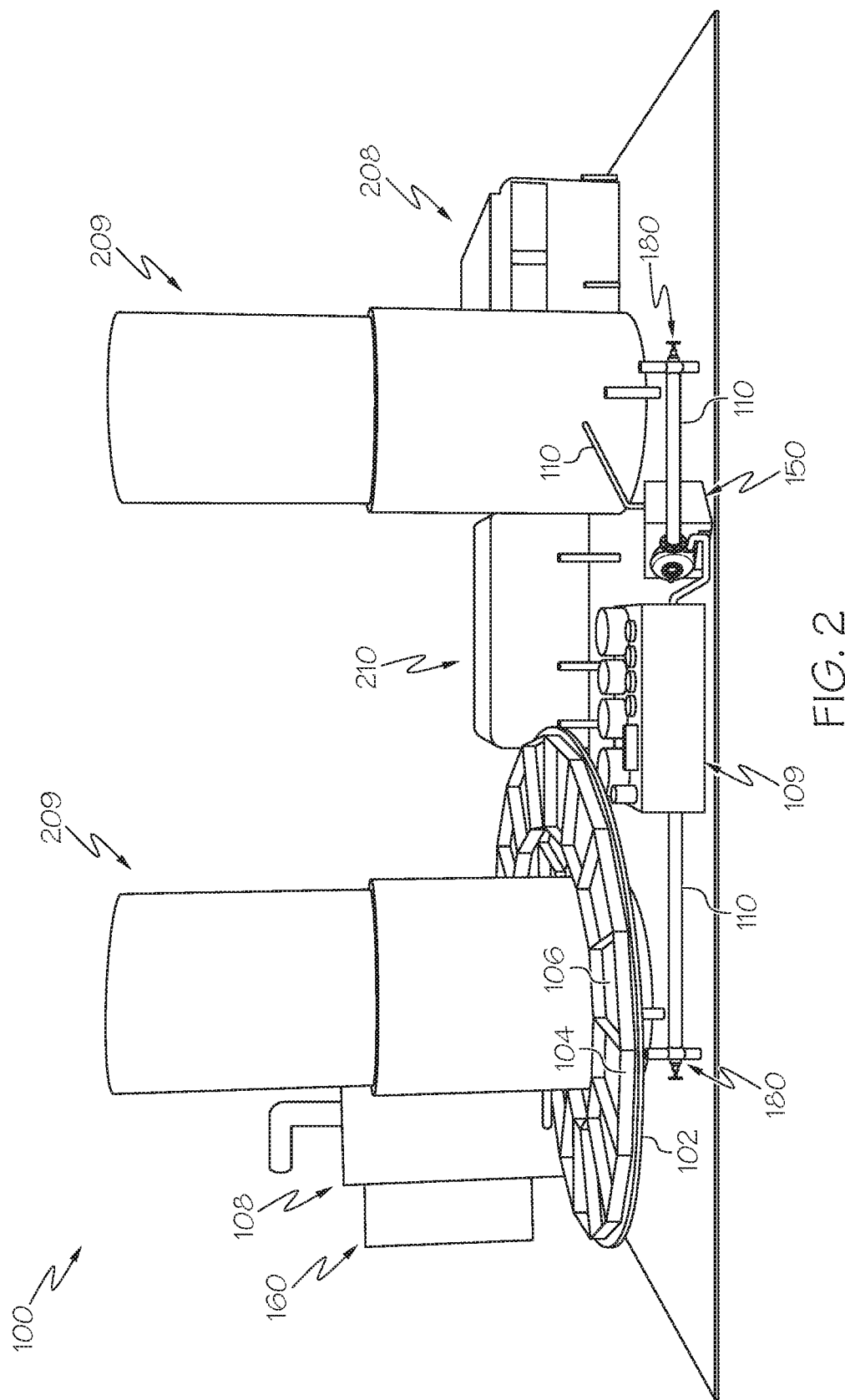
FIG. 2 schematically depicts a front perspective view of an illustrative assembly line grow pod having a master controller with portions of a track removed for purposes of illustrating additional components of the assembly line grow pod according to one or more embodiments shown and described herein.

In addition to the various components described hereinabove with respect to FIGS. 1A and 1B, the assembly line grow pod may further include additional components that are specifically related to storing fluid, moving fluid, distributing fluid, pressurizing fluid, combining fluids, and/or the like. For example, FIG. 2 schematically depicts a front perspective view of an illustrative assembly line grow pod with portions of a track removed for purposes of illustrating additional components of the assembly line grow pod. More specifically, FIG. 2 depicts a plurality of fluid holding tanks 209. The fluid holding tanks 209 may generally be storage tanks that are adapted to hold various fluids, including water, water and nutrient combinations, nutrients, gasses (including oxygen, carbon dioxide, nitrogen, and/or the like). In some embodiments, the fluid holding tanks 209 may be fluidly coupled to one or more of the water lines 110, the one or more fluid pumps 150, the watering component 109, and/or the one or more airflow lines 112 (FIG. 1A) to supply the fluid contained therein to various portions of the assembly line grow pod via the one or more water lines 110 and/or the one or more airflow lines 112 (FIG. 1A) when other components control fluid flow (for example, the one or more fluid pumps 150, the watering component 109, and/or the one or more peristaltic pumps (not shown)). Still referring to FIG. 2, the fluid holding tanks 209 are otherwise not limited by the present disclosure, and may have any other features or characteristics without departing from the scope of the present disclosure.

As described above, the master controller 160 may direct the watering component 109 to provide various fluids to the trays 106 of the carts 104 and/or provide airflow to the assembly line grow pod 100 or portions thereof. More specifically, the watering component 109 may contain or be fluidly coupled to the one or more fluid pumps 150 that pump the various fluids and/or the one or more flow control valves 180 that direct the various fluids to particular areas within the assembly line grow pod (for example, the watering stations that include the one or more peristaltic pumps) from the one or more fluid holding tanks 209.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Figure 3:
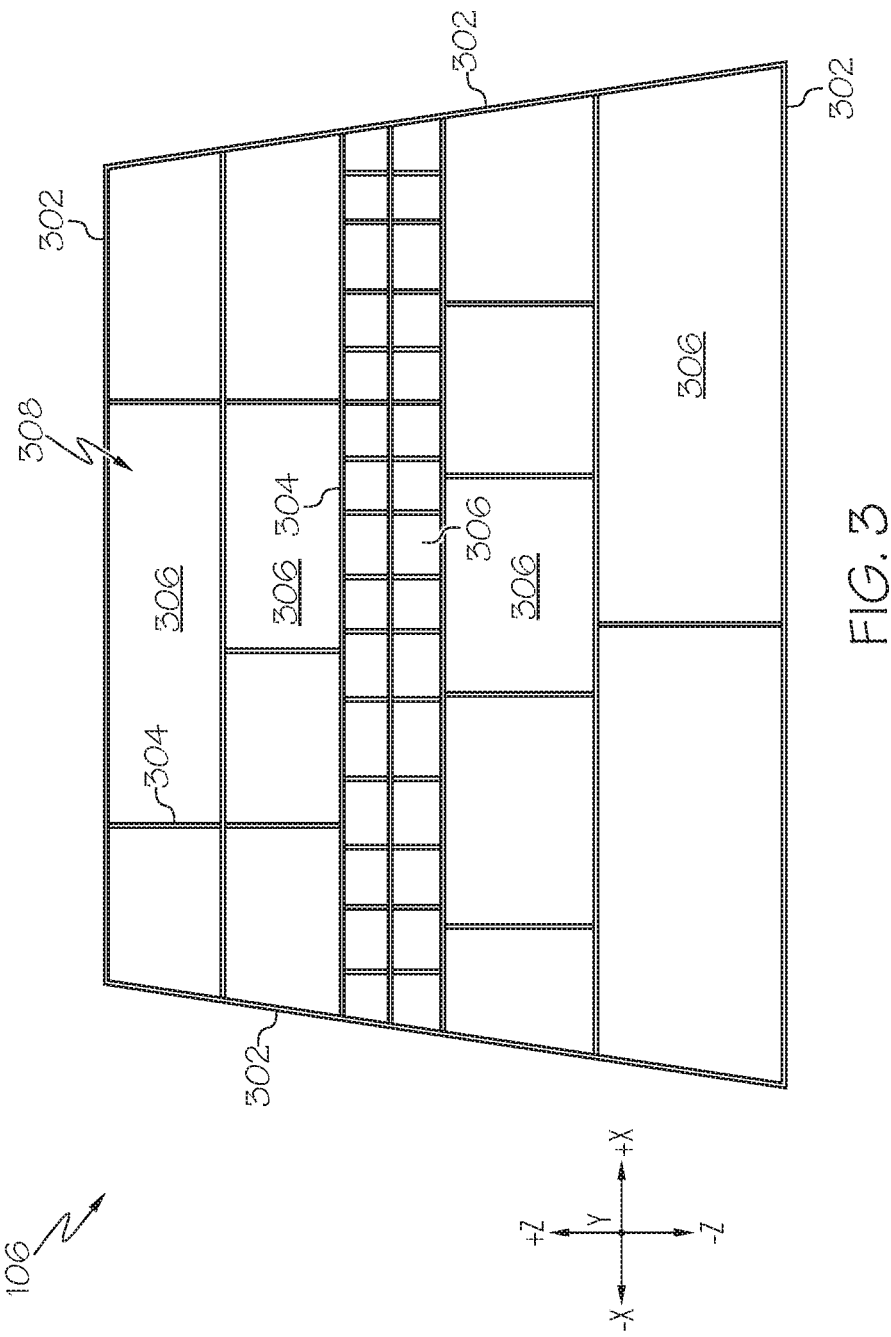
FIG. 3 depicts a top view of an illustrative tray that is used for holding plant material according to one or more embodiments shown and described herein.

Referring now to FIG. 3, a top view of the tray 106 is depicted according to various embodiments. As previously described herein, the tray 106 may have a plurality of sections 306 therein for holding plant material as the cart holding the tray 106 traverses the track within the assembly line grow pod 100 (FIG. 1A). Still referring to FIG. 3, the tray 106 may have a plurality of side walls 302 that define the outer edges of the tray 106 and further define a cavity 308 within the tray 106 that holds the plant material therein. The side walls 302 are not limited in number, size, or arrangement by the present disclosure. As shown in the embodiment in FIG. 3, the side walls 302 may be arranged and sized to form a trapezoidal shaped tray 106. That is, two side walls 302 may be arranged substantially parallel to one another along the x-axis of the coordinate axes depicted in FIG. 3, and two other side walls may be arranged such that they are mirror images of one another along the z-axis of the coordinate axes of FIG. 3. However, other shapes and sizes are also contemplated.

In addition to the plurality of side walls 302, the tray 106 may further include a plurality of interior walls 304 that are shaped, sized, and arranged to define the plurality of sections 306 within the cavity 308 of the tray 106. The sections 306 are not limited by this disclosure, and may be any shape or size within the tray 106. In some embodiments, the tray 106 may include a plurality of identically-shaped and sized sections 306. For example, the tray 106 may include a honeycomb-like arrangement of sections that are all the same size and shape. In other embodiments, such as the embodiment depicted in FIG. 3, the tray 106 may include a plurality of different sized and shaped sections 306. That is, not all of the sections 306 are identically shaped and/or sized. Rather, one or more sections 306 may have a first shape and/or size and one or more other sections 306 may have a second shape and/or size. In such embodiments, the differently shaped and/or sized sections 306 may generally allow for different amounts of seeds to be held by each section 306 according to a predetermined seed density recipe, different amounts of fluid (including water and/or nutrients) to be received by each section 306 according to a predetermined watering and/or nutrient distribution recipe, different types of plant material to be held by each section 306, plant material at differing stages of growth to be held by each section 306, and/or the like. Without such differently sized sections 306, the seeds, fluids, types of plant material, stage of growth, and/or the like may have to remain consistent throughout the entire cavity 308, which may be disadvantageous in some embodiments. For example, if the particular tray 106 is utilized for the purposes of testing to determine which of a plurality of seed densities, seed types, amounts of fluid, and/or the like provides the most advantageous results (for example, the quickest plant growth), it may be advantageous to test for multiple variables at once in a single tray instead of a plurality of trays, which may waste material and/or resources, and/or may be inefficient and excessively time consuming.

Figure 4:
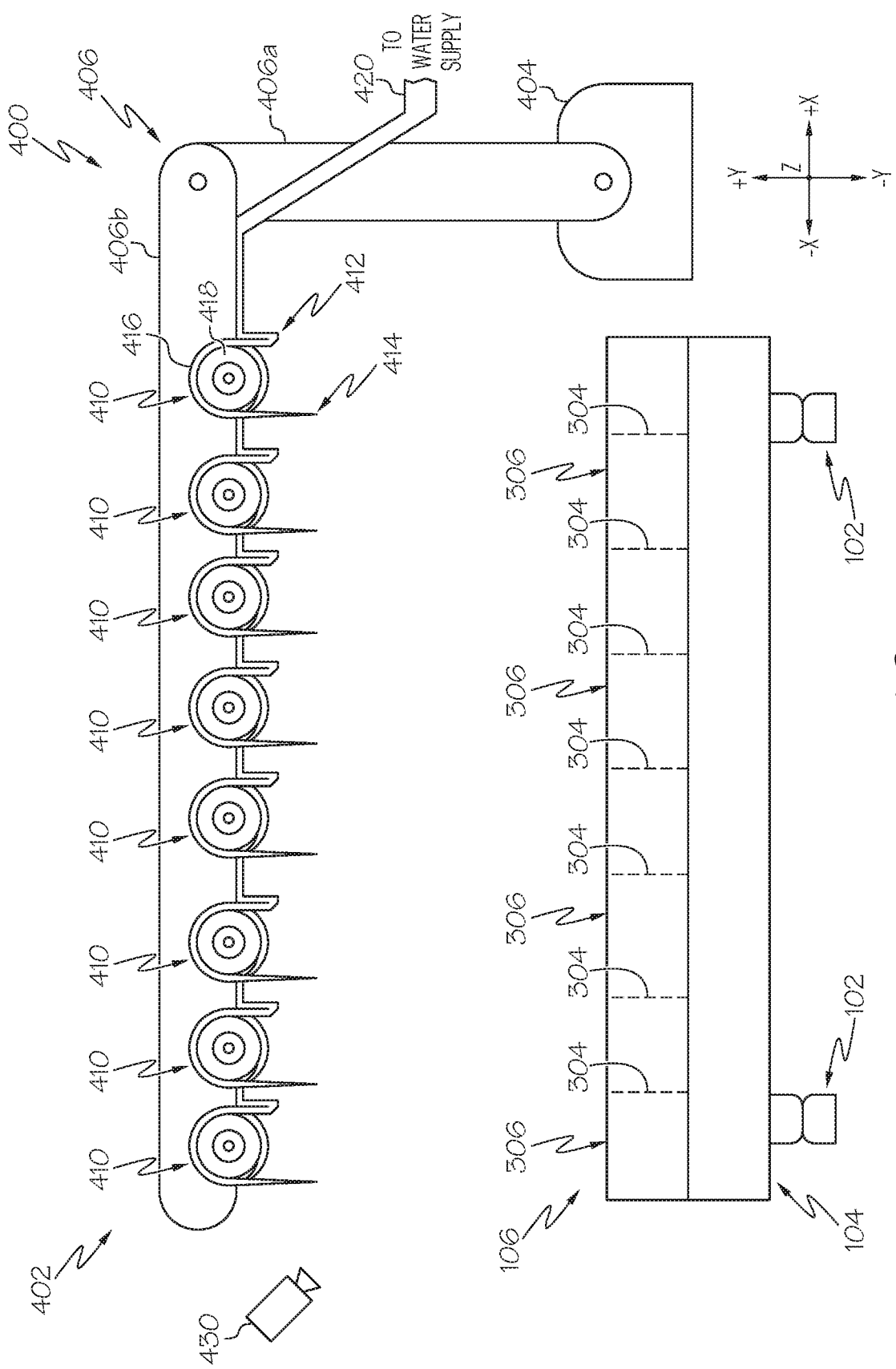
FIG. 4 depicts a side view of an illustrative watering station comprising an illustrative robot harm holding a plurality of peristaltic pumps above the tray depicted in FIG. 3 according to one or more embodiments shown and described herein.

Referring now to FIG. 4, a watering station 400 within the assembly line grow pod 100 (FIG. 1A) is shown. The watering station 400 includes an arrangement of one or more peristaltic pumps 410 relative to the one or more trays 106 held by a cart 104 and supported on the track 102 when the cart 104 is positioned adjacent to the one or more peristaltic pumps 410 within the watering station 400. More specifically, FIG. 4 schematically depicts a side view of an illustrative plurality of peristaltic pumps 410 supported on an arm 406 of a robot device 402 (which, collectively, may be referred to as a robot arm) and aligned with a plurality of sections 306 in the tray 106 on the cart 104 supported on the track 102 within the assembly line grow pod 100 (FIG. 1A). That is, each of the plurality of peristaltic pumps 410 may be arranged above a corresponding one of the plurality of sections 306 in the +y direction of the coordinate axes of FIG. 4. However, it should be understood that the plurality of peristaltic pumps 410 may also be arranged above a tray 106 having a single section or space for holding seeds, as described hereinabove.

The plurality of peristaltic pumps 410 supported by the arm 406 of the robot device 402 depicted in FIG. 4 function within the watering station 400 as a portion of the water distribution component to supply fluid (e.g., water, nutrients, etc.) to the sections 306 within the tray 106 supported by the cart 104 on the track 102. The watering station 400 including the arm 406 of the robot device 402 supporting the plurality of peristaltic pumps 410 may generally be located at any location within the assembly line grow pod 100 (FIG. 1A), but may be particularly located adjacent to the track 102, as described in greater detail herein.

Figure 5:
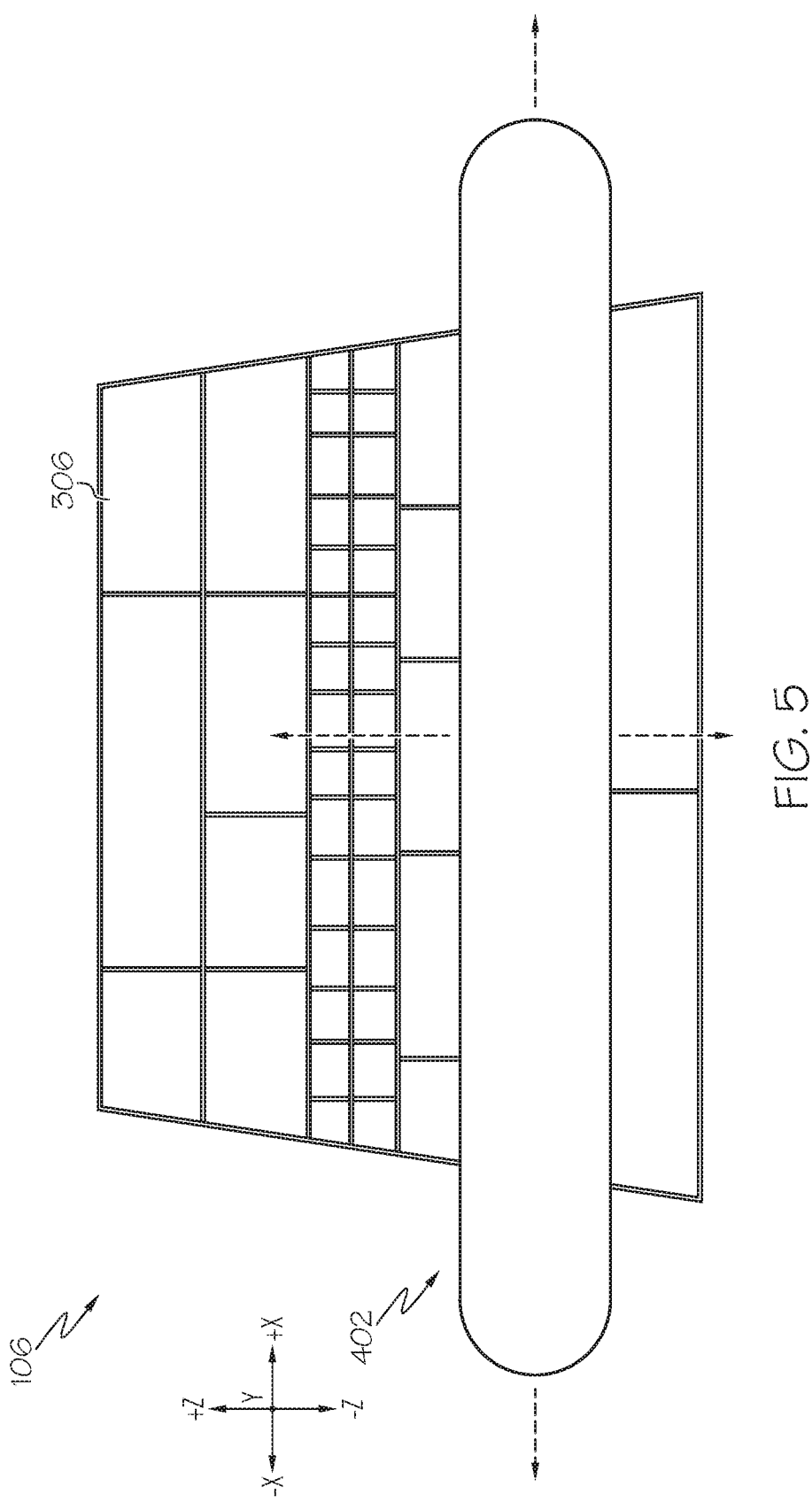
FIG. 5 depicts a top view of the robot arm and the tray depicted in FIG. 4.

In some embodiments, the robot device 402 may further include a base 404 that supports the arm 406 of the robot device 402 (such as a first arm section 406a and a second arm section 406b). The base 404 may be fixed in a particular location or position relative to the track 102. That is, the base 404 of the robot device 402 may not move relative to the track 102. Rather, the cart 104 may move each tray 106 along the track 102 within the vicinity of the arm 406 of the robot device 402 and the peristaltic pumps 410 positioned thereon. In other embodiments, the base 404 of the robot device 402, the first arm section 406a, and/or the second arm section 406b may each be movable such that the location or positioning of the peristaltic pumps 410 can be changed relative to the tray 106 so as to distribute a precise amount of fluid to each section 306 within the tray 106. That is, the base 404 of the robot device 402 may be movable (e.g., via wheels, skis, a continuous track, gears, and/or the like), such that the base 404 can traverse an entire length of a tray 106, traverse a portion of the track 102, and/or the like. For example, as shown in FIG. 5, the robot device 402 may move in the direction of the dashed arrows (e.g., in the +x/−x directions and/or the +y/−y directions of the coordinate axes of FIG. 5) such that the peristaltic pumps 410 (FIG. 4) are positioned over a particular one of the sections 306 of the tray 106 such that a particular amount of fluid is distributed to that particular one of the sections 306.

Referring again to FIG. 4, the first arm section 406a may be hingedly coupled to the base 404 such that the first arm section 406a is rotatable about the base 404 to change the positioning of the arm 406 (and thus the peristaltic pumps 410) relative to the tray 106. In addition, the second arm section 406b may be hingedly coupled to the first arm section 406a such that the second arm section 406b is rotatable about the first arm section 406a to change the positioning of the arm 406 (and thus the peristaltic pumps 410) relative to the tray 106. The arm sections 406a, 406b may be moved, for example, by actuators or the like (not depicted) that are coupled to each arm section 406a, 406b. While only two arm sections of the arm 406 are depicted in FIG. 4, fewer or greater arm sections are contemplated and included within the scope of the present disclosure.

As a result of the movability of the base 404, the first arm section 406a, and the second arm section 406b, the positioning of the robot device 402 can be adjusted in any manner relative to the tray 106 for the purposes of aligning a particular peristaltic pump 410 with a particular section 306 of the tray 106. Accordingly, any predetermined amount of water can be delivered to any particular section 306 of the tray 106 at any time, regardless of the size or location of the section 306 on the tray 106, the movement (or lack thereof) of the tray 106, and/or the like. As a result, the flexible configuration of the watering station 400 ensures an appropriate amount of fluid is delivered as needed to ensure optimal growth of the plant material.

Each of the peristaltic pumps 410 may generally include an inlet 412 fluidly coupled to an outlet 414 via a flexible connector tube 416. The inlet 412 is fluidly coupled to a supply tube 420, which, in turn, is fluidly coupled to a water supply, such as the watering component 109 via the water lines 110 (FIG. 1A) as described herein.

Still referring to FIG. 4, as a result of the configuration of the peristaltic pump 410, the fluid that is received at the inlet 412 from the one or more water lines 110 (FIG. 1A) via the supply tube may subsequently be distributed out of the peristaltic pump 410 through the outlet 414. In addition, the outlet 414 of each peristaltic pump 410 may be positionable over the tray 106 such that fluid ejected from the outlet 414 is distributed into the tray 106 and/or a section 306 thereof.

A rotor 418 having a plurality of rollers (not depicted) coupled thereto and spaced apart rotates about an axis, which causes each of the rollers to compress a portion of the flexible connector tube 416. As the rotor 418 turns, the portion of the flexible connector tube 416 under compression is pinched closed (e.g., occludes), thus forcing the fluid to be pumped to move through the connector tube 416 from the inlet 412 towards the outlet 414 between the rollers. Further details regarding the components and functionality of the peristaltic pump should generally be understood, and are not described in greater detail herein. The spacing of the rollers on the rotor 418, the pressure of the fluid (as provided by the various other pumps and valves described herein), and/or the rotational speed may be adjusted to control the amount of fluid that is trapped between the rollers within the flexible connector tube 416 and subsequently ejected out of the outlet 414 into a corresponding one of the sections 306 of the tray 106. For example, a closer spacing of the rollers may result in less spacing between the occluded areas of the connector tube 416, which can hold a smaller volume of fluid, relative to a further apart spacing of the rollers. In another example, an increased fluid pressure supplied to the inlet 412 from the supply tube 420 may force more fluid into the flexible connector tube 416 at a time, relative to a lower fluid pressure supplied to the inlet 412.

In addition to providing a very specific amount of fluid to the tray 106 and/or a particular section 306 of the tray 106, the peristaltic pumps 410 utilize a closed system that reduces or eliminates exposure of the fluid within the components of the peristaltic pumps 410 to contaminants, particulate matter, and/or the like. That is, unlike other components that may be used to distribute fluid to the tray 106, the peristaltic pumps 410 do not directly expose the fluid to moving parts, which may cause contaminants to mix with the fluid. For example, other components that utilize components that involve metal-to-metal contact may generate metallic dust as a result of the metal-to-metal contact, which can mix with the fluids and negatively affect growth of the plant material.

It should be understood that while FIG. 4 depicts eight peristaltic pumps 410 (and eight corresponding outlets 414), the present disclosure is not limited to such. That is, the robot device 402 may support fewer than or greater than eight peristaltic pumps 410 (and eight corresponding outlets 414). In some embodiments, the number of peristaltic pumps 410 (and corresponding outlets 414) may correspond to a number of sections 306 in a particular tray 106 such that a single outlet 414 deposits a precise amount of fluid into a corresponding section 306. In some embodiments, the number of peristaltic pumps 410 and outlets 414 may correspond to the number of sections 306 that exists across a length of the tray 106. For example, if the tray 106 contains eight sections 306 across the length thereof (as shown in FIG. 4), the arm 406 of the robot device 402 may correspondingly support eight peristaltic pumps 410 (and correspondingly eight outlets 414). In addition, the tray 106 may contain successive rows of sections 306, as shown in FIG. 3. Accordingly, as the cart 104 moves the tray 106 along the track 102 (or as the robot device 402 moves relative to the tray 106), the peristaltic pumps 410 may successively deposit a specific amount of fluid in each successive row as the rows pass under the outlets 414 of the peristaltic pumps 410. It should be understood that due to the movability of the robot device 402 as described herein, a corresponding number of outlets 414 and sections 306 within the tray 106 is not necessary.

The positioning of the various peristaltic pumps 410 with respect to one another is not limited by this disclosure, and may be positioned in any configuration. In some embodiments, the peristaltic pumps 410 may be positioned in a substantially straight line. In other embodiments, the peristaltic pumps 410 may be positioned such that they are staggered in a particular pattern. In yet other embodiments, the peristaltic pumps 410 may be arranged in a grid pattern. In yet other embodiments, the peristaltic pumps 410 may be arranged in a honeycomb pattern.

Also depicted in FIG. 4 is a sensor 430. The sensor 430 may generally be arranged to sense various characteristics of the tray and the contents therein. For example, the sensor 430 may be arranged to sense a size, shape, and location of each section 306 within the tray 106, the location of the interior walls 304 that form the sections 306, a presence, type, and/or amount of growth of plant material within the tray 106, and/or the like. The embodiment shown in FIG. 4 depicts the sensor 430 as an imaging device, such as a camera or the like. However, it should be understood that other types of sensors may also be used without departing from the scope of the present disclosure. For example, the sensor 430 may be a pressure sensor positioned underneath the tray 106 and/or the cart 104 that detects a weight of a portion of the tray 106 and/or the cart 104. In addition, while the embodiment shown in FIG. 4 merely depicts a single sensor 430, this is also illustrative. In some embodiments, a plurality of sensors may be included. The sensor 430 may be communicatively coupled to various other components of the assembly line grow pod 100 (FIG. 1A) such that signals, data, and/or the like can be transmitted between the sensor 430 and/or the other components, as described in greater detail herein.

Figure 6:
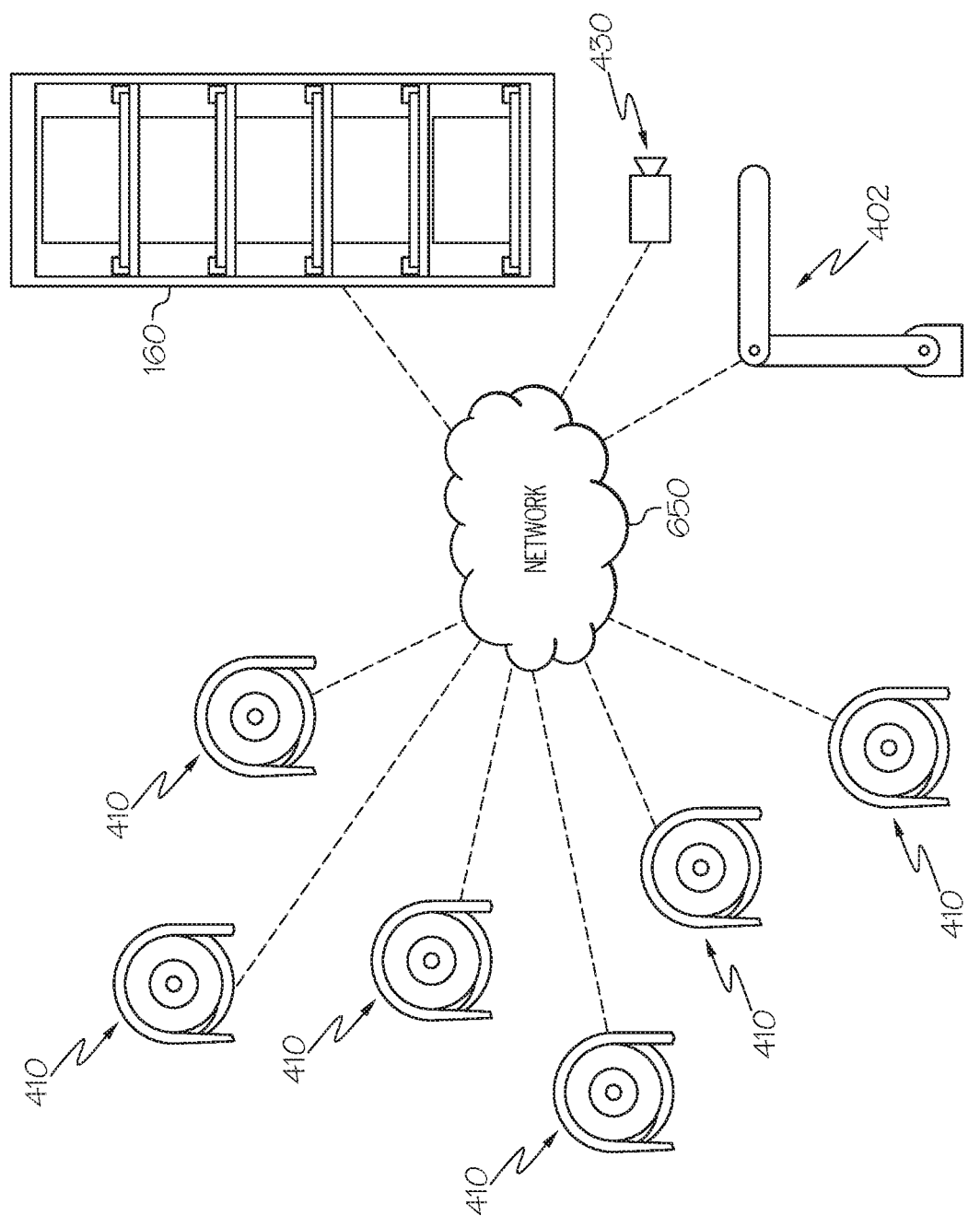
FIG. 6 schematically depicts a master controller communicatively coupled to a plurality of peristaltic pumps, a robot device, and a sensor in an assembly line grow pod network according to one or more embodiments shown and described herein.

Referring now to FIG. 6, the master controller 160 (or a component thereof) communicatively coupled to a plurality of peristaltic pumps 410, a robot device 402, and a sensor 430 in an assembly line grow pod communications network 650 is depicted, according to various embodiments. In some embodiments, the master controller 160 may be communicatively coupled to the peristaltic pumps 410, the robot device 402, and/or the sensor 430 via the communications network 650. The communications network 650 may include the internet or other wide area network, a local network, such as a local area network, or a near field network, such as Bluetooth or a near field communication (NFC) network. In other embodiments, instead of being connected via the communications network 650, the master controller 160 may be directly connected to the peristaltic pumps 410, the robot device 402, and/or the sensor 430 for the purposes of communications.

In some embodiments, communications between the master controller 160, the peristaltic pumps 410, the robot device 402, and the sensor 430 may be such that the master controller 160 provides transmissions, such as data and signals, to the peristaltic pumps 410, the robot device 402, and/or the sensor 430 for the purposes of directing operation of the peristaltic pumps 410, the robot device 402, and/or the sensor 430. That is, the master controller 160 may direct the peristaltic pumps 410 when to pump fluid, when to stop pumping fluid, how much fluid to pump, a rate at which the fluid should be pumped, the direction of fluid pumping, and/or the like. In addition, the master controller 160 may direct the robot device 402 when to move, where to move, and/or the like. Further, the master controller 160 may direct the sensor 430 when to sense, provide instructions for repositioning the sensor 430, and/or the like.

In other embodiments, communications between the master controller 160 and the peristaltic pumps 410, the robot device 402, and/or the sensor 430 may be such that the master controller 160 receives feedback from the peristaltic pumps 410, the robot device 402, and/or the sensor 430. That is, the master controller 160 may receive data, signals, or the like that are indicative of pump/robot/sensor operation, including whether the peristaltic pumps 410, the robot device 402, and/or the sensor 430 are operating correctly or incorrectly, start/stop logs, capacity and rate logs, whether any errors have been detected, a location of the watering station 400 (FIG. 4) within the assembly line grow pod 100 (FIG. 1A), data relating to the layout of the sections 306 of the tray 106 (FIG. 3) and/or the like. Still referring to FIG. 6, the master controller 160 may utilize this feedback to make adjustments to the peristaltic pumps 410 and/or the robot device 402 (e.g., adjust the location and/or operation of the peristaltic pumps 410 relative to the sections 306 of the tray 106 (FIG. 4)), to direct operation of other components of the assembly line grow pod 100 (FIG. 1A), to communicate with other portions of the assembly line grow pod 100 (FIG. 1A), and/or the like to ensure that the assembly line grow pod 100 (FIG. 1A) continues to run in an appropriate manner.

The various internal components of the master controller 160 may generally provide the functionality of the master controller 160 (or a component thereof, such as a control module), as described herein. That is, the internal components of the master controller 160 may be a computing environment. Illustrative examples of components will be described in greater detail hereinbelow.

While FIG. 6 depicts the master controller 160, a plurality of peristaltic pumps 410, a single sensor 430, and a single robot device 402, this is merely illustrative. For example, the master controller 160 may be coupled to a plurality of peristaltic pumps 410, a plurality of sensors 430, and/or a plurality of robot devices 402. Other combinations of the master controller 160, peristaltic pumps 410, sensors 430, and robot devices 402 are included within the scope of the present disclosure.

Figure 7:
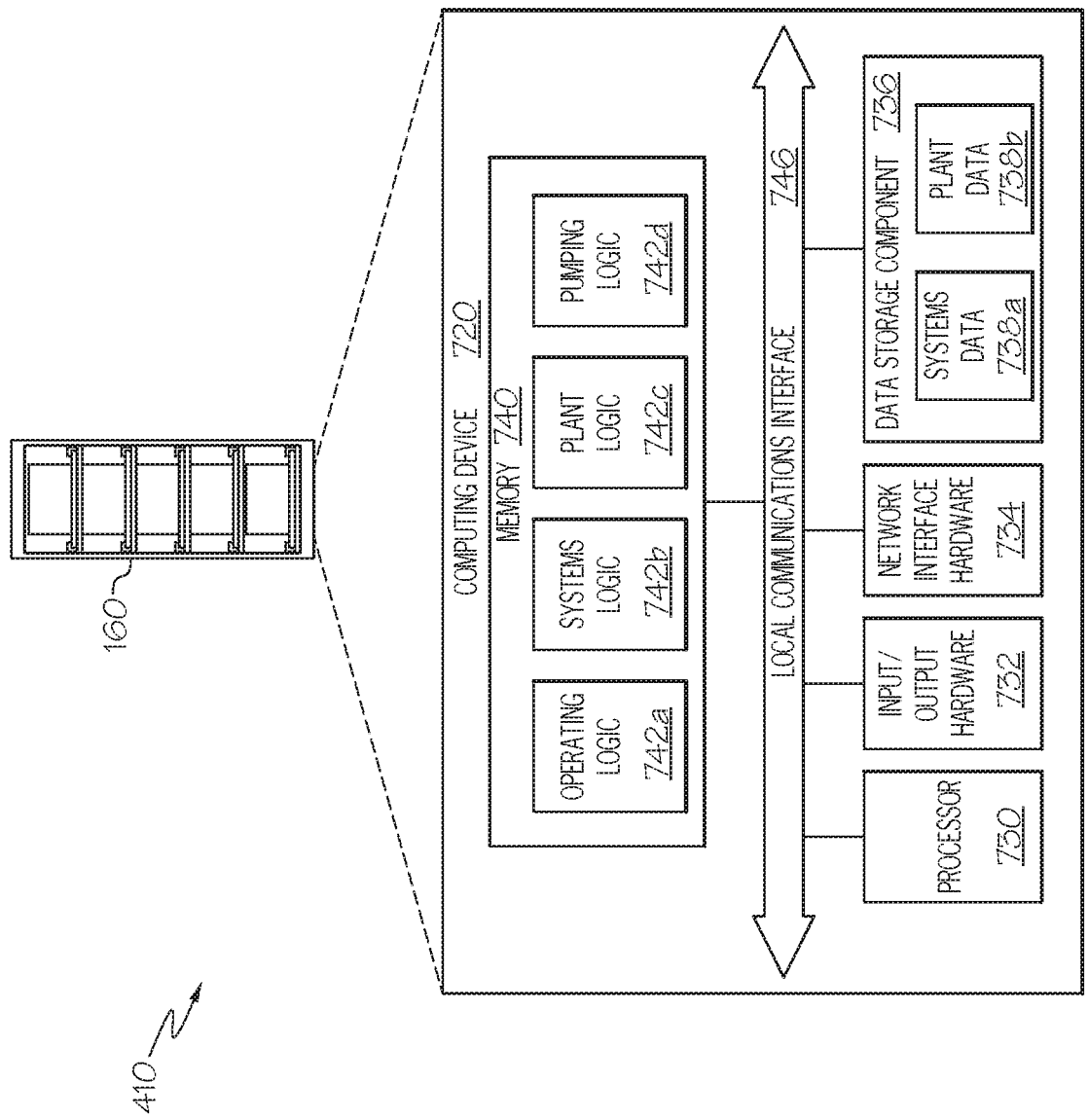
FIG. 7 schematically depicts an illustrative computing environment within a master controller according to one or more embodiments shown and described herein.

FIG. 7 depicts an illustrative computing environment within the master controller 160 according to one or more embodiments. As illustrated in FIG. 6, the master controller 160 may include a computing device 720. The computing device 720 includes a memory component 740, a processor 730, input/output hardware 732, network interface hardware 734, and a data storage component 736 (which stores systems data 738a, plant data 738b, and/or other data).

At least a portion of the components of the computing device 720 may be communicatively coupled to a local interface 746. The local interface 746 is generally not limited by the present disclosure and may be implemented as a bus or other communications interface to facilitate communication among the components of the master controller 160 coupled thereto.

The memory component 740 may be configured as volatile and/or nonvolatile memory. As such, the memory component 740 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the master controller 160 and/or external to the master controller 160. The memory component 740 may store, for example, operating logic 742a, systems logic 742b, plant logic 742c, pumping logic 742d, and/or other logic. The operating logic 742a, the systems logic 742b, the plant logic 742c, and pumping logic 742d may each include a plurality of different pieces of logic, at least a portion of which may be embodied as a computer program, firmware, and/or hardware, as an example.

The operating logic 742a may include an operating system and/or other software for managing components of the master controller 160. As described in more detail below, the systems logic 742b may monitor and control operations of one or more of the various other control modules and/or one or more components of the assembly line grow pod 100 (FIG. 1A). Still referring to FIG. 7, the plant logic 742c may be configured to determine and/or receive a recipe for plant growth and may facilitate implementation of the recipe via the systems logic 742b and/or the pumping logic 742d. The pumping logic 742d may be configured to determine which ones of a plurality of peristaltic pumps 410 (FIG. 4) need to be activated or deactivated to facilitate fluid movement throughout the assembly line grow pod 100 (FIG. 1A) according to a recipe and/or a need for fluid at a particular location at a particular time, determine a rate of fluid to be pumped, determine an amount of fluid to be pumped, transmit signals and/or data to the various peristaltic pumps 410 and/or to the robot devices 402 (FIG. 4), and/or the like.

It should be understood that while the various logic modules are depicted in FIG. 7 as being located within the memory component 740, this is merely an example. For example, the systems logic 742b, the plant logic 742c, and the pumping logic 742d may reside on different computing devices. That is, one or more of the functionalities and/or components described herein may be provided by a user computing device, a remote computing device, and/or another control module that is communicatively coupled to the master controller 160.

Additionally, while the computing device 720 is illustrated with the systems logic 742b and the plant logic 742c as separate logical components, this is also an example. In some embodiments, a single piece of logic (and/or or several linked modules) may cause the computing device 720 to provide the described functionality.

The processor 730 (which may also be referred to as a processing device) may include any processing component operable to receive and execute instructions (such as from the data storage component 736 and/or the memory component 740). Illustrative examples of the processor 730 include, but are not limited to, a computer processing unit (CPU), a many integrated core (MIC) processing device, an accelerated processing unit (APU), a digital signal processor (DSP). In some embodiments, the processor 730 may be a plurality of components that function together to provide processing capabilities, such as integrated circuits (including field programmable gate arrays (FPGA)) and the like.

The input/output hardware 732 may include and/or be configured to interface with microphones, speakers, a display, and/or other hardware. That is, the input/output hardware 732 may interface with hardware that provides a user interface or the like. For example, a user interface may be provided to a user for the purposes of adjusting settings (e.g., an amount of nutrients/water to be supplied, a type and amount of ambient air conditions to be supplied, etc.), viewing a status (e.g., receiving a notification of an error, a status of a particular pump or other component, etc.), and/or the like.

The network interface hardware 734 may include and/or be configured for communicating with any wired or wireless networking hardware, including an antenna, a modem. LAN port, wireless fidelity (Wi-Fi) card, WiMax card, ZigBee card, Z-Wave card. Bluetooth chip, USB card, mobile communications hardware, and/or other hardware for communicating with other networks and/or devices. From this connection, communication may be facilitated between the master controller 160 and other components of the assembly line grow pod 100 (FIG. 1A), such as, for example, other control modules, the seeder component, the harvesting component, the watering component, the one or more pumps, and/or the like. In some embodiments, the network interface hardware 734 may also facilitate communication between the master controller 160 and components external to the assembly line grow pod 100 (FIG. 1A), such as, for example, user computing devices and/or remote computing devices. As such, the network interface hardware 734 may be communicatively coupled to the I/O port 608 of the master controller 160 (FIG. 6).

Still referring to FIG. 7, the master controller 160 may be coupled to a network (e.g., the communications network 650 (FIG. 6)) via the network interface hardware 734. As previously described herein, various other control modules, other computing devices, and/or the like may also be coupled to the network. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 720 for at least a partial implementation by the master controller 160. Another example may include the master controller 160 sending notifications to a user of the user computing device.

Similarly, the remote computing device may include a server, personal computer, tablet, mobile device, etc. and may be utilized for machine to machine communications. As an example, if the assembly line grow pod 100 (FIG. 1A) determines a type of seed being used (and/or other information, such as ambient conditions), the computing device 720 may communicate with the remote computing device to retrieve a previously stored recipe for those conditions. As such, some embodiments may utilize an application program interface (API) to facilitate this or other computer-to-computer communications.

Still referring to FIG. 7, the data storage component 736 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 736 may reside local to and/or remote from the master controller 160 and may be configured to store one or more pieces of data and selectively provide access to the one or more pieces of data. As illustrated in FIG. 7, the data storage component 736 may store systems data 738a, plant data 738b, and/or other data. The systems data 738a may generally include data relating to the functionality of the master controller 160, such as stored settings, information regarding the location of the master controller 160 and/or other modules within the master controller 160 (FIG. 1B), and/or the like. The plant data 738b may generally relate to recipes for plant growth, settings of various components within the assembly line grow pod 100 (FIG. 1A), data relating to control of the peristaltic pumps 410 and/or the robot device 402 (FIG. 4), sensor data relating to a particular tray or cart (e.g., sensor data from the sensor 430 (FIG. 4)), and/or the like.

It should be understood that while the components in FIG. 7 are illustrated as residing within the master controller 160 (and/or a component thereof, such as a control module), this is merely an example. In some embodiments, one or more of the components may reside external to the master controller 160. It should also be understood that, while the master controller 160 is illustrated as a single device, this is also merely an example. That is, the master controller 160 may be a plurality of devices (e.g., a plurality of hot swappable control modules) that are communicatively coupled to one another and provide the functionality described herein.

Figure 8:
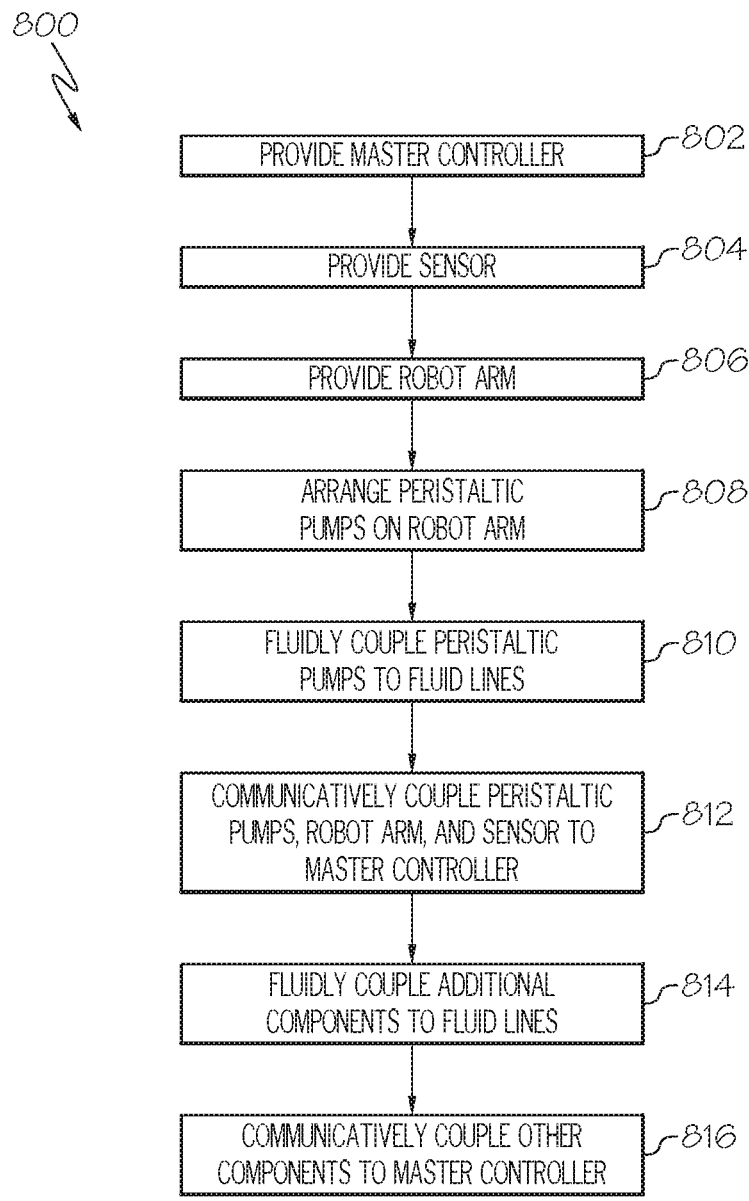
FIG. 8 depicts a flow diagram of an illustrative method of providing a master controller, one or more peristaltic pumps, a robot arm, and a sensor according to one or more embodiments shown and described herein.

FIG. 8 depicts an illustrative method of operating one or more peristaltic pumps on a robot arm in an assembly line grow pod with a control module in a master controller, generally designated 800, according to embodiments. The method 800 includes providing the master controller (and/or components thereof, such as control module(s)) at block 802, providing the sensor (or plurality of sensors in some embodiments) at block 804, and providing the robot arm (or plurality of robot arms) at block 806. As part of providing the master controller, the sensor, and the robot arm, the master controller, the sensor, and the robot arm may be positioned such that they can function as described herein. For example, the sensor may be positioned underneath the track, underneath the cart, underneath the tray, above the tray (particularly in embodiments where the sensor is an imaging device), or otherwise adjacent to the tray such that the sensor can sense various characteristics of the tray, the sections thereof, and/or the plant material therein, as described herein.

At block 808, the peristaltic pumps may be arranged on the robot arm such that the peristaltic pumps are positioned to dispense fluid as described herein. That is, the peristaltic pumps may be spaced a distance apart such that the outlets thereof are generally aligned with a tray that passes under the robot arm and/or sections thereof.

At block 810, the peristaltic pumps are each fluidly coupled to fluid lines (e.g., water lines) to receive fluid from the watering component, as described herein. As such, the inlets of the peristaltic pumps are fluidly coupled to the supply tube, which, in turn, is coupled to the water lines that extend from the watering component.

At block 812, the various components may be communicatively coupled to the master controller for the purposes of communication as described herein. That is, the peristaltic pumps, the robot arm, and the sensors may each be communicatively coupled to the master controller such that data and/or signals may be transmitted therebetween. As previously described herein, the peristaltic pumps, the robot arm, and the sensors may be communicatively coupled via wired or wireless means.

At block 814, other components may be fluidly coupled to the fluid lines (e.g., water lines). For example, one or more fluid pumps and/or one or more flow control valves may be fluidly coupled to the water lines, as described in greater detail herein. Such other components may be particularly coupled to deliver a sufficient amount of fluid (including water and/or nutrients) to the peristaltic pumps for the purposes of delivering to the trays or sections thereof.

Additionally, the other components (e.g., the flow control valves and/or the fluid pumps) may also be communicatively coupled to the master controller at block 816. That is, the one or more flow control valves and/or the fluid pumps may each be communicatively coupled to the master controller such that data and/or signals may be transmitted therebetween. As previously described herein, the other components may be communicatively coupled via wired or wireless means.

Figure 9:
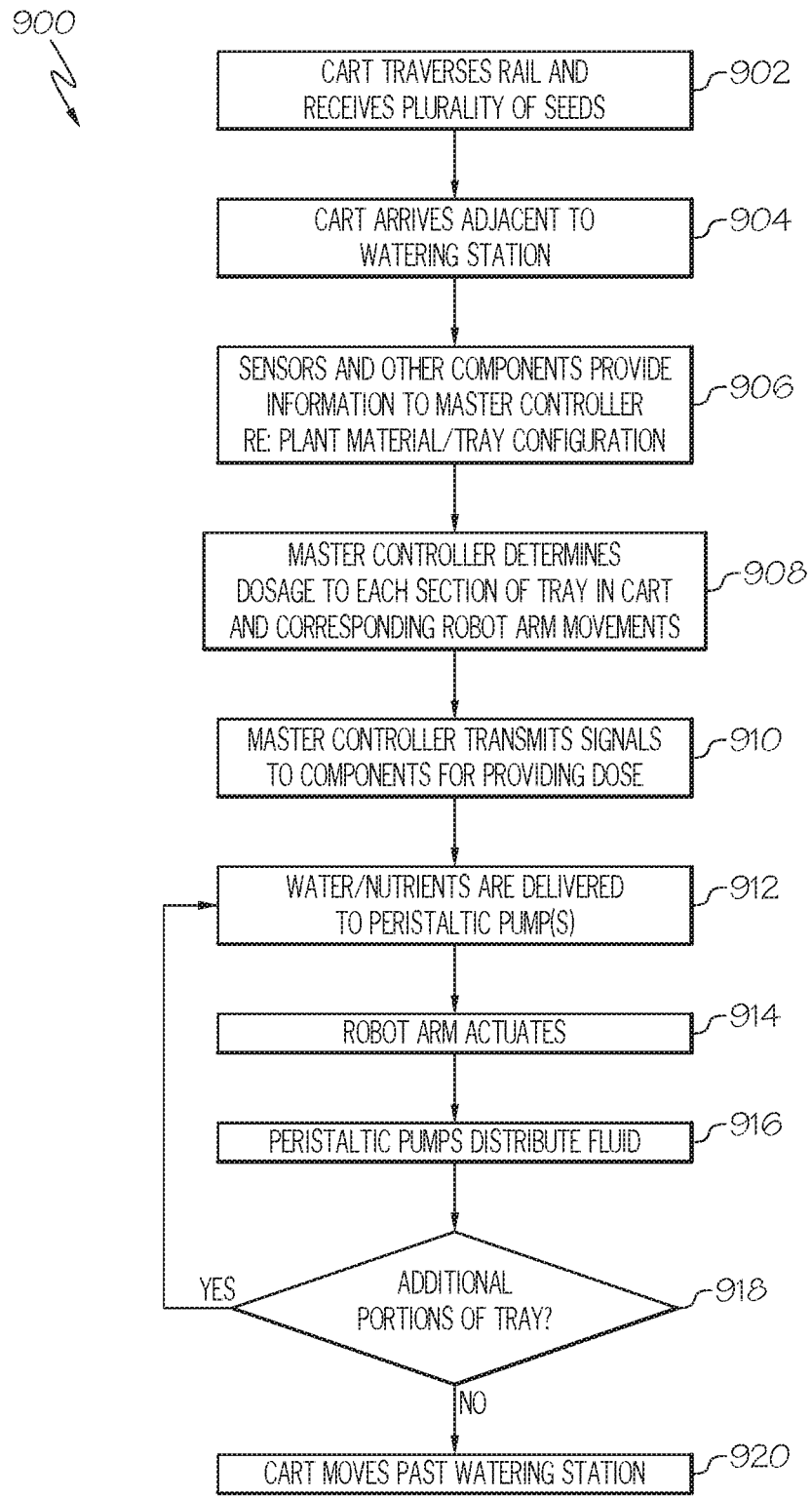
FIG. 9 depicts a flow diagram of an illustrative method of operating one or more peristaltic pumps on a robot arm in an assembly line grow pod with a control module in a master controller according to one or more embodiments shown and described herein.

FIG. 9 depicts a flow diagram of an illustrative method of operating one or more peristaltic pumps and/or one or more robot arms in an assembly line grow pod, generally designated 900, according to embodiments. As illustrated at block 902, a powered cart traversing a rail receives a plurality of seeds for growth from a seeding component. For example, the seeding component may deposit one or more seeds within each section of the tray supported on the cart, and/or the like.

At block 904, the cart arrives at (or adjacent to) a watering station for providing water to the plurality of seeds. That is, the cart traverses the track of the assembly line grow pod until the cart is adjacent to the watering station such that the peristaltic pumps and the robot arm can be utilized to provide a specific amount of fluid (e.g., water and/or nutrients) to each section in the tray and/or to the tray as a whole.

At block 906, the sensors provide information regarding the seeds and/or the tray (e.g., the location, size, shape, positioning, etc. of the sections within the tray) to the master controller so that the master controller can determine the precise amount of fluid necessary to water and/or supply nutrients to each section in the tray on the cart, as well as robot arm movements necessary for distribution, at block 908. For example, the sensors may provide information regarding an existing amount of fluid within a particular section, the type of plant material present in the section, the location of each section, the size of each section, the shape of each section, the positioning of each section relative to other sections, and/or the like. This information is then used to determine how much fluid is necessary to be provided by each peristaltic pump and where the peristaltic pump needs to be located relative to the tray (particularly a section thereof), which may be based on a recipe or the like that requires a very particular amount of fluid to be provided to each section accordingly. It should be understood that the number of sections within the tray to be watered at a particular time may not precisely correspond to the number of peristaltic pumps. As such, the master controller may determine which of the peristaltic pumps deliver water at a particular time, as well as robot arm positioning that ensures appropriate alignment. In addition, the robot arm positioning may be dynamic to account for movement of the cart on which the tray is supported (e.g., the cart may continuously move along the track without stopping). Additional details regarding this step are described herein with respect to FIG. 10.

At block 910, the master controller transmits signals to the various components that participate in providing a dose of fluid to each section. That is, the master controller may transmit signals to the peristaltic pumps, the robot arm, the cart, the sensors, the fluid pumps, the flow control valves, the watering component, and/or the like.

Fluid is pumped into the peristaltic pumps at block 912, the robot arm actuates at block 914 to move into position, and the peristaltic pumps deliver fluid to the corresponding sections of the tray at block 916. For example, one or more fluid pumps that are fluidly coupled to the inlets of the peristaltic pumps may receive a signal and may pump fluid accordingly (e.g., pump fluid at a particular/predetermined flow rate and/or pressure). The pumped fluid then enters the peristaltic pumps and is distributed accordingly once the robot arm has moved the peristaltic pumps into position for distribution. It should be understood that, fluid may be moved into all of the peristaltic pumps at once, one peristaltic pump at a time, or only a portion of the peristaltic pumps. For example, if the tray only includes six sections to be watered at a particular time and the robot arm holds eight peristaltic pumps, water may only be delivered to six peristaltic pumps that correspond in location to the sections of the tray based on robot arm positioning.

At block 918, a determination is made as to whether fluid is to be delivered to other portions of the tray. For example, if the number sections of the tray to be watered outnumber the number of peristaltic pumps, the determination may be that additional fluid is to be delivered. If additional fluid is to be delivered, the process may repeat at block 912. If not additional fluid is to be delivered, the cart may continue to move along the track and away from the watering station at block 920.

Figure 10:
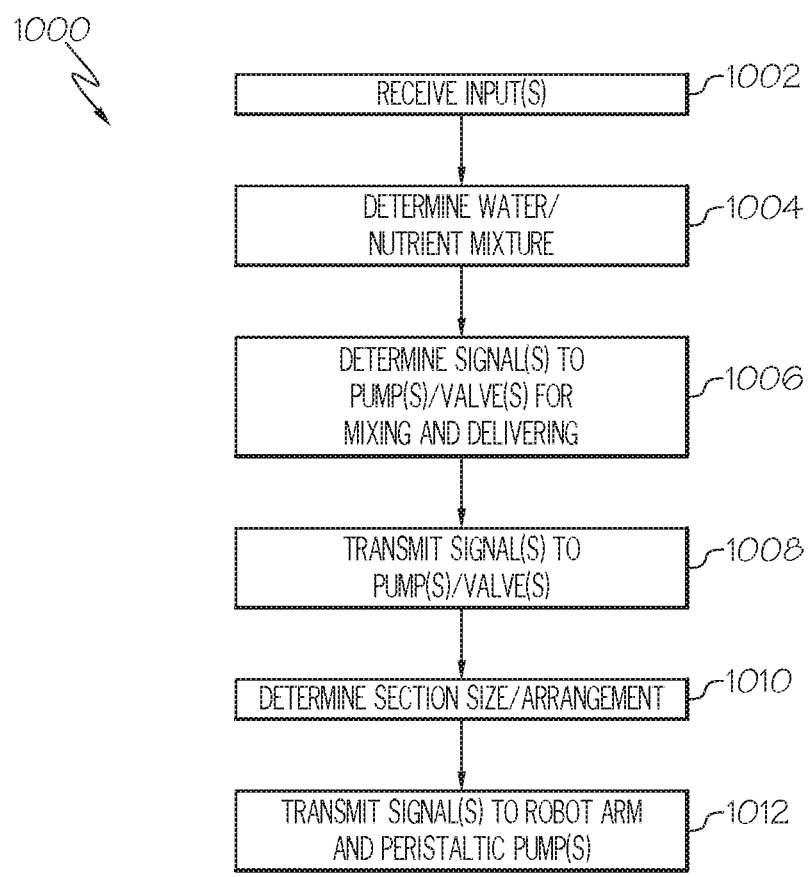
FIG. 10 depicts a flow diagram of an illustrative method of determining a water dose and transmitting signals accordingly to one or more peristaltic pumps and a robot arm according to one or more embodiments shown and described herein.

Referring now to FIG. 10, an illustrative method of determining a water dose and transmitting signals to one or more peristaltic pumps and a robot arm, generally designated 1000, according to embodiments is depicted. At block 1002, one or more inputs may be received by the master controller (and/or component thereof). Inputs may be received from any component of the assembly line grow pod, particularly those components communicatively coupled to the master controller, as described herein. For example, inputs may be received from each of the peristaltic pumps, the robot arm, one or more sensors (including sensors not specifically described herein), the fluid pumps, the fluid control valves, the watering component, the seeder component, and/or the like.

At block 1004, a water and nutrient mixture may be determined from the various inputs that were received. For example, if the various inputs indicate that Plant A is to be supplied with water and nutrients, the master controller may determine how much water and nutrients to be supplied by accessing a recipe for Plant A, determining the number of simulated days of growth, and/or the like. The master controller may further determine how much water and how much nutrients to be mixed together to ensure each section of a tray receives an appropriate dose. Accordingly, the master controller may determine at block 1006 where to transmit signals (e.g., identify fluid pumps and/or fluid control valves to receive a signal) that will result in such a determined water and nutrient mixture. Accordingly, the signals may be transmitted at block 1008 so that the mixture of water and nutrients is created for delivery to the peristaltic pumps.

At block 1010, the master controller may determine a section size, arrangement, positioning, and/or the like for the purposes of determining robot arm positioning, which peristaltic pumps to be utilized, and/or the like. Such a determination may generally be made based on signals received from sensors, information regarding the cart movement, and/or the like. Once such signals are determined, the signals may be transmitted accordingly at block 1012 such that the mixture of water and nutrients is delivered to the appropriate peristaltic pumps, and then pumped accordingly into the corresponding sections of the tray.

As illustrated above, various embodiments for distributing a precise amount of fluid to each section of a plurality of sections of a tray on a cart supported on a track in an assembly line grow pod are disclosed. As a result of the embodiments described herein, very specific control of fluid supplied to the various sections in a tray (or the tray alone) is achieved, even in instances where the number of peristaltic pumps does not correspond to the number of sections to be provided with fluid and/or in instances where the cart supporting the tray is constantly moving along the track. This very specific control of fluid ensures that only a precise amount of fluid is supplied to plant material at a particular time, thereby ensuring optimum growth of the plant material. In addition, the precise delivery of fluid via the peristaltic pumps and the robot arm avoids under watering and overwatering, misdirection of water/nutrients, as well as generation of waste water/nutrients. Moreover, the precise delivery of fluid via the peristaltic pumps reduces or eliminates dripping water being ejected into the sections and/or trays, which may impact the precise amount of fluid needed by a particular plant material.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing and operating one or more peristaltic pumps and robot arms at a watering station in an assembly line grow pod to ensure the precise placement of fluid. It should also be understood that these embodiments are merely exemplary and are not intended to limit the scope of this disclosure.

What is claimed is:
1. An assembly line grow pod comprising:
 a tray held by a cart supported on a track, the tray comprising at least one section;
 a fluid source; and
 a watering station comprising:
  a robot device comprising a base and a movable arm having a first arm section hingedly coupled to the base and a second arm section hingedly coupled to the first arm section to provide the movable arm with a range of motion along a plurality of planes, and
  a plurality of peristaltic pumps coupled to the movable arm of the robot device, wherein each peristaltic pump of the plurality of peristaltic pumps comprises an inlet and an outlet, the inlet fluidly coupled to the fluid source,
 wherein a predetermined amount of fluid from the fluid source is delivered to the at least one section of the tray via movement of the movable arm of the robot device along the plurality of planes to align each outlet of the plurality of peristaltic pumps with the at least one section and via ejection of the fluid from each outlet.

2. The assembly line grow pod of claim 1, further comprising a master controller communicatively coupled to the plurality of peristaltic pumps and the robot device, wherein the master controller transmits signals to the plurality of peristaltic pumps and the robot device to control delivery of the fluid to the at least one section of the tray.

3. The assembly line grow pod of claim 2, wherein the watering station further comprises at least one sensor communicatively coupled to the master controller, wherein the at least one sensor transmits signals or data or both to the master controller for determining a location of the at least one section of the tray relative to each outlet of the plurality of peristaltic pumps.

4. The assembly line grow pod of claim 3, wherein the at least one sensor includes an imaging device that transmits image data to the master controller.

5. The assembly line grow pod of claim 1, wherein the base of the robot device is a movable base that is movable relative to the tray.

6. The assembly line grow pod of claim 1, wherein the watering station is positioned adjacent to the track such that, when the cart, when moving along a length of the track, passes the watering station to facilitate alignment of each outlet of the plurality of peristaltic pumps with the at least one section of the tray.

7. The assembly line grow pod of claim 1, further comprising a fluid line fluidly coupled between the fluid source and each inlet of the plurality of peristaltic pumps.

8. The assembly line grow pod of claim 1, further comprising one or more flow control valves fluidly coupled between the fluid source and each inlet of the plurality of peristaltic pumps, the one or more flow control valves controlling a flow of fluid from the fluid source and each inlet.

9. The assembly line grow pod of claim 1, further comprising one or more fluid pumps fluidly coupled between the fluid source and each inlet of the plurality of peristaltic pumps, the one or more fluid pumps controlling a pressure and a flow of the fluid from the fluid source to each inlet.

10. The assembly line grow pod of claim 1, wherein the tray comprises a first plurality of sections and a second plurality of sections, wherein the first plurality of sections has a shape and a size that is different from the second plurality of sections.

11. The assembly line grow pod of claim 1, wherein the fluid source is a fluid holding tank containing one or more of the following: water, a mixture of water and nutrients, or nutrients.

12. The assembly line grow pod of claim 1, wherein the fluid source includes a watering component that supplies one or more of the following: water and nutrients to plant material held in the at least one section of the tray.

13. The assembly line grow pod of claim 1, wherein the predetermined amount of the fluid that is ejected from each outlet is predetermined according to a fluid supply recipe.

14. The assembly line grow pod of claim 1, wherein the cart continuously moves along a length of the track while the predetermined amount of fluid from the fluid source is delivered.

15. A watering station adjacent to a track carrying a cart supporting a tray in an assembly line grow pod, the watering station comprising:
- a robot device comprising a movable base and a movable arm having a first arm section hingedly coupled to the movable base and a second arm section hingedly coupled to the first arm section to provide the movable arm with a range of motion along a plurality of planes;
- a plurality of peristaltic pumps supported on the movable arm of the robot device, each peristaltic pump of the plurality of peristaltic pumps comprising an outlet; and
- a sensor positioned to sense a location of one or more sections of the tray,
- wherein the robot device moves, via the movable base and the movable arm along the plurality of planes, to align each of the plurality of peristaltic pumps with the one or more sections of the tray such that a predetermined amount of fluid is distributed by each of the plurality of peristaltic pumps into the one or more sections of the tray.

16. The watering station of claim 15, wherein each of the plurality of peristaltic pumps further comprises an inlet fluidly coupled via one or more fluid lines to a fluid source.

17. The watering station of claim 15, wherein the robot device, the plurality of peristaltic pumps, and the sensor are communicatively coupled to a master controller that directs operation of the robot device, the plurality of peristaltic pumps, and the sensor.

18. The watering station of claim 15, wherein the one or more sections of the tray include a first plurality of sections and a second plurality of sections, the first plurality of sections having a shape and a size that is different from the second plurality of sections.

19. A method of providing a predetermined amount of fluid in an assembly line grow pod, the method comprising:
- moving a cart supporting a tray having a plurality of sections containing plant material therein along a track adjacent to a watering station comprising a movable robot device supporting a plurality of peristaltic pumps, the movable robot device comprising a movable arm having a base, a first arm section hingedly coupled to the base, and a second arm section hingedly coupled to the first arm section to provide the movable arm with a range of motion along a plurality of planes;
- determining an amount of fluid to be delivered to each section of the plurality of sections;
- determining one or more movements of at least one of the base, the first arm section, and the second arm section of the movable robot device to align the plurality of peristaltic pumps with the plurality of sections;
- directing the movable robot device to move according to the one or more movements; and
- directing the plurality of peristaltic pumps to eject the determined amount of fluid into the plurality of sections.

20. The method of claim 19, further comprising:
sensing a location and configuration of the plurality of sections.

\* \* \* \* \*